Patented Nov. 10, 1953

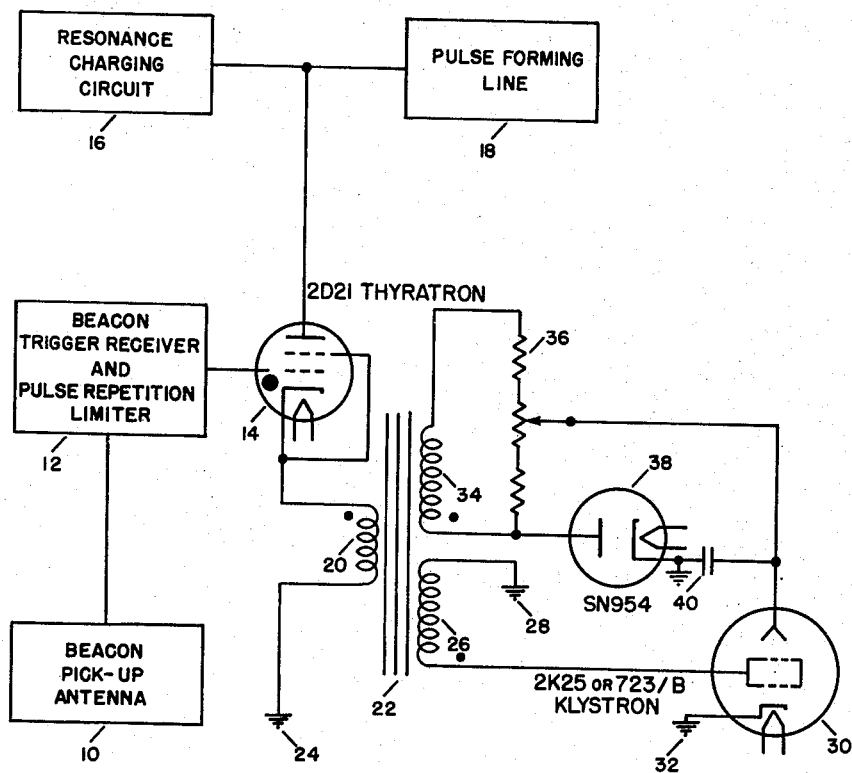

2,659,007

UNITED STATES PATENT OFFICE 2,659,007

PULSE RECTIFIER CIRCUIT

Eugene P. Halpin, South Bend, Ind., assignor to Bendix Aviation Corporation, Detroit, Mich., a corporation of Delaware Application June 24, 1949, Serial No. 101,113

5 Claims. (Cl. 250—36)

This invention relates to electrical circuits, and more particularly to a rectifier circuit for applying a constant negative voltage to the repeller element of a reflex oscillator, such as a klystron tube.

It is common knowledge that the conventional pulse transformer having a 200 v. pulse input and two high voltage pulse outputs connected respectively to the cavity resonator and to the repeller of a klystron tube does not produce a satisfactory spectrum. The incident invention aims to overcome this objection.

It has been found that the supply of a constant negative voltage of about 600 v. to the repeller, both improves the spectrum and increases the power output of the klystron, and that this may be accomplished by imposing a network between the secondary of the transformer and the repeller of the klystron. Such a network may include a rectifier tube, a smoothing capacitor providing a substantially constant 600 v. supply to the repeller of the klystron and a potentiometer resistor for adjusting the voltage of the repeller.

An object of the invention is to provide an efficient pulse rectifier circuit for obtaining a high constant negative voltage to the repeller of a klystron tube.

Yet another object of the invention is to provide a simple network connected between the secondary of a pulse-transformer and the repeller of a klystron tube oscillator the effect of which is to improve the spectrum and increase the power output of the klystron.

Other objects and advantages of the invention will appear from the following description when taken in connection with the accompanying drawings forming a part of this specification and in which the single figure is a diagrammatic illustration of a pulse rectifier circuit embodying the invention.

Referring to the drawings for more specific details of the invention, 10 indicates a beacon pick-up antenna connected through a beacon trigger receiver and pulse repetition limiter 12 to the grid of a thyratron tube 14, the plate of which is connected to a resonant charging circuit 16 and a pulse forming line 18. The screen grid and the cathode of the thyratron tube 14 are connected to one terminal of the primary 20 of a pulse transformer 22, the other terminal of which is grounded as indicated at 24. The thyratron tube 14 serves as a switch which closes upon the reception of pulses from the antenna 10 so that a continuous circuit is established from the pulse forming line 18 to the primary winding 20 of the pulse transformer 22.

A secondary 26 of the pulse-transformer 22 has one of its terminals grounded as indicated at 28 and its other terminal connected to the cavity resonator of a reflex oscillator, such as a klystron tube 30, the cathode of which is grounded as indicated at 32.

Another secondary 34 of the pulse transformer 22 has a potentiometer 36 connected across its terminals. This secondary 34 is connected in series with a rectifier tube 38 and a smoothing capacitor 40 to the repeller of the klystron tube 30 and the movable element of the potentiometer 36 is connected to the capacitor 40 and the repeller of the klystron tube.

In operation, the trigger pulse comes in from the antenna 10 through the trigger receiver and pulse repetition limiter 12 to the thyratron tube 14 which switches the pulse-forming line 18 to the primary 20 of the pulse-transformer 22. The secondary 26 of the pulse-transformer supplies a high voltage positive pulse to the cavity resonator of the klystron tube oscillator 30 during the operation of the thyratron tube 14.

The thyratron tube 14 ceases to operate when the output voltage of the pulse-forming line drops to near zero, actually at about 0.7 microsec. later. It is of course, understood that the thyratron tube deionizes about 100 microsecs. later. While the positive pulse exists in the secondary 26, the secondary 34, which is oppositely connected, produces a negative pulse which is rectified for the repeller of the klystron.

While this invention has been described in connection with certain embodiments, the principle involved is susceptible of numerous other applications that will readily occur to persons skilled in the art. The invention is, therefore, to be limited as indicated by the scope of the appended claims.

Having thus described the invention, what I claim as new and desire to secure by Letters Patent is:

1. In combination, a reflex oscillator having a cathode, a cavity resonator and a repeller, a pulse transformer having a primary winding and a pair of secondary windings, one of the secondary windings being connected to the cavity resonator to provide a positive pulse, a voltage smoothing network connected between the other secondary winding and the oscillator repeller to provide a substantially direct voltage having a value less than the voltage on the oscillator cathode, and a switch connected to the pulse transformer and adapted to be periodically closed to provide pulses through the transformer.

2. In combination, a reflex oscillator having a grounded cathode, a cavity resonator and a repeller, a pulse transformer having a primary winding and a pair of secondary windings, one of the secondary windings being connected to the cavity resonator to periodically provide positive pulses to the cavity, a voltage smoothing network, the other secondary winding being connected to the repeller and the smoothing network to apply a substantially constant negative voltage of considerable magnitude to the repeller, and means for providing pulses to the primary winding of the pulse transformer.

3. In combination, a normally open switch, a resonant charging circuit, a pulse forming line connected to the switch, means for closing the switch to provide a discharge path for the pulse forming line, a reflex oscillator having a cathode, a cavity resonator and a repeller, a pulse transformer having a primary winding and a pair of secondary windings, the primary winding of the pulse transformer being connected to the switch to receive the discharge pulse through the switch, one of the secondary windings of the pulse transformer being connected to the cavity resonator, and a rectifier circuit connected between the other secondary winding and the oscillator repeller to admit only a negative voltage to the repeller.

4. In combination, a normally non-conductive gas-filled tube having a cathode, grid and plate, a pulse forming line connected to the plate of the tube, a resonant charging circuit connected to the pulse forming line to charge the line between pulses, means connected to the grid of the tube to introduce pulses for triggering the tube into a condition of conductivity at periodic intervals, a pulse transformer having a primary winding and a pair of secondary windings, the primary winding being connected to the cathode of the tube, a reflex oscillator having a cathode, a cavity resonator and a repeller, one of the secondary windings being connected to the cavity resonator to apply pulses of voltage to the resonator, and rectifying means connected between the other secondary winding and the repeller to apply a substantially direct voltage of negative polarity to the repeller.

5. In combination, a normally non-conductive gas-filled tube having a plate, a grid and a cathode, a pulse transformer having a primary winding and a pair of secondary windings, the primary winding being connected between ground and the cathode of the tube, a reflex oscillator having a cathode, a cavity resonator and a plate, the cathode of the reflex oscillator being grounded, one of the secondary windings being connected between ground and the cavity resonator to apply pulses of positive voltage to the resonator, a rectifier connected between the other secondary winding and the repeller to apply a substantially direct voltage of negative polarity on the repeller, a pulse forming line connected to the plate of the gas-filled tube to produce a pulse of current through the tube and the primary winding upon the conductance of the tube, a resonant charging circuit for charging the pulse forming line during the periods between pulses, and means connected to the grid of the gas-filled tube for producing a conductance of the tube at periodic intervals.

EUGENE P. HALPIN.

References Cited in the file of this patent

UNITED STATES PATENTS

| Number | Name | Date |
| --- | --- | --- |
| 2,138,162 | Hansell | Nov. 29, 1938 |
| 2,392,380 | Varian | Jan. 8, 1946 |
| 2,394,389 | Lord | Feb. 5, 1946 |
| 2,409,591 | Salzberg | Oct. 15, 1946 |
| 2,474,580 | Hiehle | June 28, 1949 |
| 2,494,568 | Lundy | Jan. 17, 1950 |

OTHER REFERENCES

Principles of Radar, Radar School, M. I. T., McGraw-Hill, New York, 1946. Copy in Scientific Library, pp. 6–19, 6–24, and 6–28.